US 6,577,865 B2

(12) United States Patent
Dikmen et al.

(10) Patent No.: US 6,577,865 B2
(45) Date of Patent: Jun. 10, 2003

(54) SYSTEM FOR INTERCEPT OF WIRELESS COMMUNICATIONS

(75) Inventors: Cemal Tamer Dikmen, Shelton, CT (US); Murat Karabatur, Millford, CT (US)

(73) Assignee: Ulysses Holdings, LLC, Shelton, CT (US)

( * ) Notice: Subject to any disclaimer, the term of this patent is extended or adjusted under 35 U.S.C. 154(b) by 0 days.

(21) Appl. No.: 09/186,966

(22) Filed: Nov. 5, 1998

(65) Prior Publication Data

US 2003/0078041 A1 Apr. 24, 2003

(51) Int. Cl.[7] .............................................. H04Q 7/20
(52) U.S. Cl. ........................ 455/433; 455/445; 455/432
(58) Field of Search .............................. 455/433, 445, 455/432, 436, 403, 405, 422

(56) References Cited

U.S. PATENT DOCUMENTS 5,913,161 A  *  6/1999 Ozulkulu et al. ........... 455/405
6,122,499 A  *  9/2000 Magnusson ................. 455/405

* cited by examiner

Primary Examiner—Melur Ramakrishnaiah
(74) Attorney, Agent, or Firm—Pennie & Edmonds LLP

(57) ABSTRACT

A system for the intercept of wireless communications provides that a HLR of a wireless communications system includes one or more flags associated with each subscriber, and the HLR notifies an intercept server each time a call event is detected in the HLR for a subscriber under surveillance as indicated by the flags. The intercept server includes a Gateway Delivery Function module and one or more Delivery Function modules, wherein the Gateway Delivery Function module provisions the Delivery Function modules depending on the location of the suscriber, to deliver call content or data from an MSC to a collection function operated by a law enforcement agency. Non-call associated data is also provided to a Delivery Function module for delivery to a Collection Function.

18 Claims, 5 Drawing Sheets

| MIN# | SURVEILLANCE FLAGS | | | |
|---|---|---|---|---|
| ID #1 | 1 | 2 | ... | n |
| ID #2 | 1 | 2 | ... | n |
| ID #3 | 1 | 2 | ... | n |
| ... | | | | |
| ID #n | 1 | 2 | ... | n |

FIG. 4

SYSTEM FOR INTERCEPT OF WIRELESS COMMUNICATIONS

TECHNICAL FIELD OF THE INVENTION

The present invention relates generally to wireless communications, and more particularly to the lawful intercept of wireless communications.

BACKGROUND OF THE INVENTION

Court authorized access to telephone communications and call-identifying information is one of the most crucial tools for effective law enforcement. The introduction of new digitally based technologies, transmission modes, services, and features have made it increasingly difficult for law enforcement to conduct court authorized electronic surveillance. In particular, it is now difficult to tap wireless communications because communication channels are dynamically provisioned wireless channels, such that there is no static line to tap, and furthermore because subscribers frequently move from one wireless service provider to another.

In October of 1994, at the request of the nation's law enforcement community, Congress took action to protect public safety and national security by enacting the Communications Assistance for Law Enforcement Act (CALEA). CALEA sets forth the interception assistance capability requirements that telecommunications carriers need to meet and maintain within their networks to assist law enforcement in conducting electronic surveillance. These requirements apply to the intercept of wireless communications. Referring to FIG. 1, there is illustrated in simplified form an overview of a wireless network 1. Network 1 includes a number of cells 2 each with an antennae 3 connected to a mobile switching center (MSC) 4. MSC 4 is in turn connected to the SS7 network 5 and the public switched telephone network 6. Cells 2 each serve a plurality of wireless subscribers 7.

In order to meet the requirements of law enforcement to intercept wireless communications, the telecommunications industry has defined an interface specification between a Telecommunication Service Provider (TSP) and a Law Enforcement Agency (LEA), called the J-STD-025. The J-STD-025, "Lawfully Authorized Electronic Surveillance", is a joint standard by the Telecommunications Industry Association (TIA) Committee TR45.2 and the Alliance for Telecommunications Industry Solutions (ATIS) Committee T1-Telecommunications. Compliance to J-STD-025 is seen by the telecommunications industry as "safe harbor" under Section 107 of the CALEA, Public Law 103-414.

J-STD-025 views the intercept function as five broad categories: access, delivery, collection, service provider administration, and law enforcement administration. The relationships between these functional categories are shown in FIG. 2. As illustrated in FIG. 2, the Service Provider Administration Function 10 is responsible for controlling the TSP access and delivery functions. The Law Enforcement Administration (LEA) Function 12 is responsible for controlling the LEA collection functions. The Access Function 14, consisting of one or more Intercept Access Points (IAPs), isolates an intercept subject's communications or call-identifying information unobtrusively. The Access Function 14 provides access to wireless communications traversing a wireless network such as that illustrated in FIG. 1. The Delivery Function 16 is responsible for accepting information from one or more Access Functions 14 and delivering intercepted communications to one or more Collection Functions 18. The Delivery Function 16 delivers information over two distinct types of channels: Call Content Channels (CCCs) and Call Data Channels (CDCs). The CCCs are generally used to transport call content, such as voice or data communications. The CDCs are generally used to transport messages which report call-identifying information, such as calling party identities and called party identities. The Collection Function 18 is responsible for collecting and analyzing intercepted communications and call-identifying information. The Collection Function 18 is the responsibility of the LEA.

SUMMARY OF THE INVENTION

According to one embodiment of the invention, there is provided a system for intercept of wireless communications which includes a home location register (HLR) including one or more surveillance flags associated with a subscriber served by the HLR, and wherein the flag(s) indicate one or more aspects of the subscriber's wireless communications are to be monitored. A Gateway Delivery Function module provisions the flags in the HLR, and receives call associated data for a subscriber under surveillance. A Delivery Function module, provisioned by the Gateway Delivery Function module, receives call associated data for the surveilled subscriber from the Gateway Deliver Function module and call content for the respective call. The Delivery Function module delivers the call content and call associated data to a desired destination. These and further aspects of the embodiments of the invention are described and claimed below.

BRIEF DESCRIPTION OF THE DRAWINGS

FIG. 4 illustrates surveillance flags in a home location register (HLR) according to one embodiment of the invention.

DETAILED DESCRIPTION OF THE INVENTION

Figure 1:
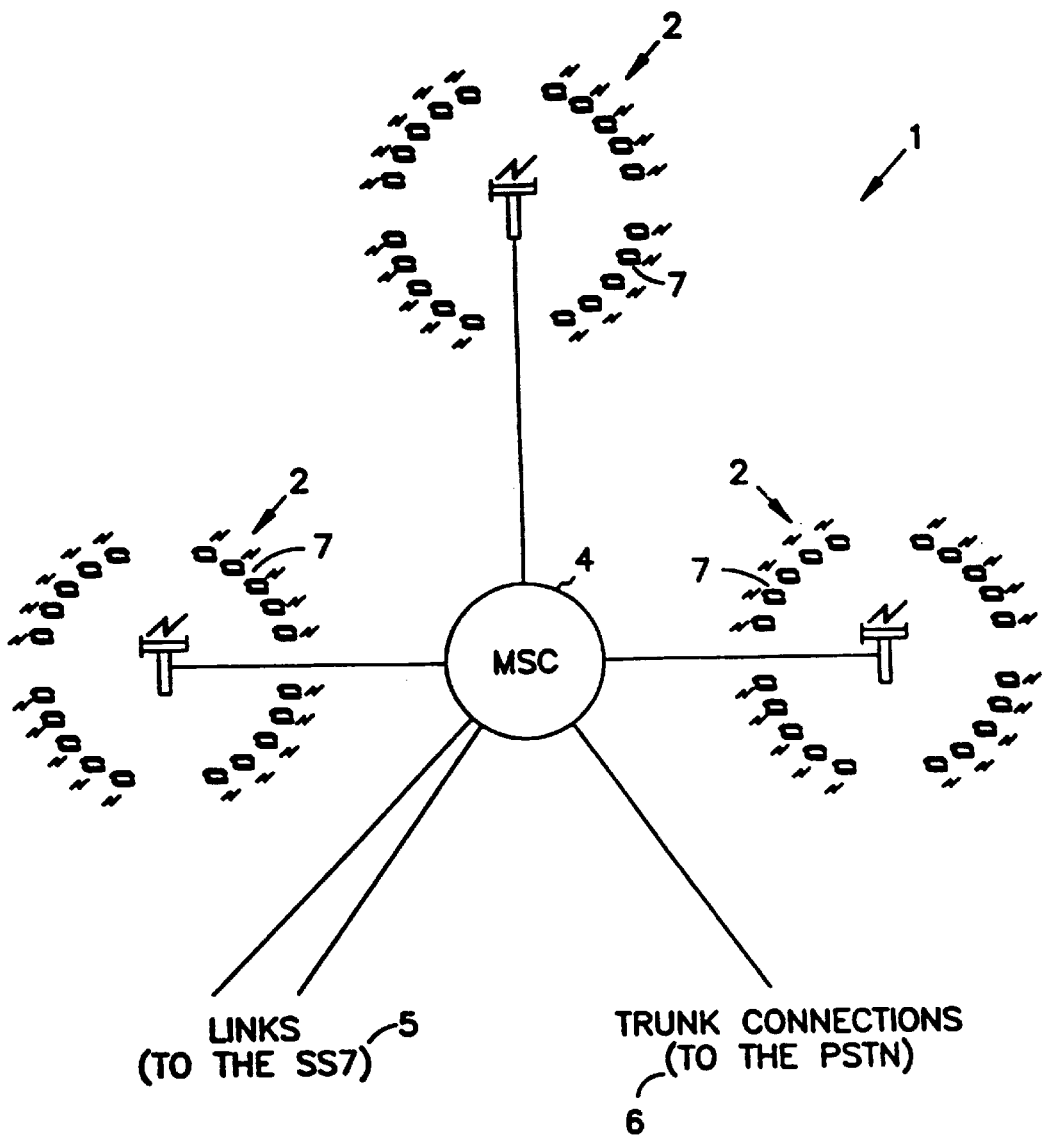
FIG. 1 illustrates a conventional wireless communications network.
Figure 2:
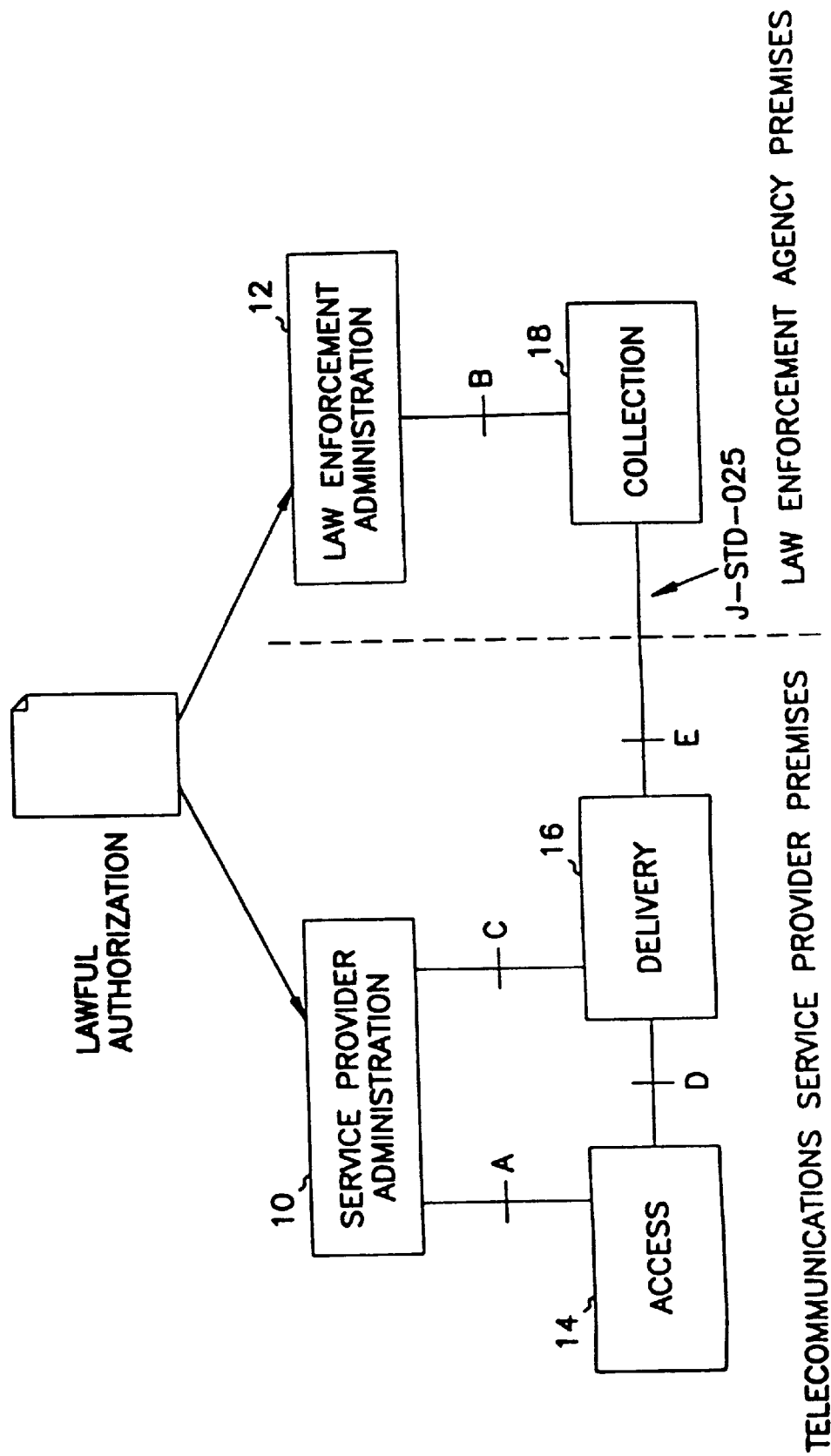
FIG. 2 illustrates a conceptualization of the electronic surveillance model of the Communications Assistance for Law Enforcement Act (CALEA).

In the following detailed description of the invention, reference is made to the accompanying drawings which form a part thereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

The intercept server 20 of the present invention as described below allows a Telecommunications Service Provider (TSP) to deliver intercepted call content (e.g. voice, packet data, modem data) and call identifying information to an authorized Law Enforcement Agency (LEA) under a court order. The three types of basic services to be provided to a LEA are: 1) non-call associated services to provide information about intercept subjects that is not necessarily related to a call; 2) call associated services to provide call identifying information about calls involving the intercept subjects; and 3) content surveillance services to provide access to an intercept subject's communications. In addition to the basic services, J-STD-025 defines optional services that could be offered by the TSP and LEA equipment. One service has been defined to test the end-to-end connection from the Access Function to the Collection Function. There are 11 messages defined within the J-STD-025 for all of these services.

Currently, the Serving System Message is the only message defined for non-call associated information surveillance services. It is used to report a change in the current TSP or service area for terminal or personal mobility. The intercept server 20 as described below supports the Serving System Message by passing it to the LEA Collection Functions in a CDC.

Call associated information surveillance services access information pertaining to call and service processing. In other words, this is call-identifying and call-progress information for calls made by an intercept subject or for calls made to an intercept subject, which include abandoned and incomplete call attempts and calls that are redirected by the intercept subject's equipment, facilities, or services. J-STD-025 defines six events for circuit-mode calls only that should be delivered to the LEA. The intercept server 20 supports all of the six messages defined for these six events. These messages are:

1. Answer: A party has answered the call attempt.
2. Change: The identity(ies) of a call has been merged with the identity(ies) of other call(s) or split into multiple call identities.
3. Origination: The system has routed a call dialed by the subject or the system has translated a number for the subject.
4. Redirection: A call has been redirected (e.g., forwarded, diverted, or deflected).
5. Release: The facilities for the entire call have been released.
6. Termination Attempt: A call attempt to an intercept subject has been detected.

The call content surveillance service accesses and delivers the communications of an intercept subject. J-STD-025 requires that the TSP delivers the content of the communications of the intercept subject for circuit-mode and packet-mode data. J-STD-025 defines two messages for the call content surveillance:

1) CC Open: The CC Open Message is used to indicate the beginning of a circuit-mode call content delivery. This occurs after a call is initiated, but prior to the cut-through of communications between the intercept subject and associate.
2) CC Close: The CC Close Message is used to indicate the end of call content delivery.

The intercept server 20 supports both of these messages. Also, The intercept server 20 supports multiple CCCs for intercept subjects with multiple terminals or for terminals or services supporting multiple call appearances.

J-STD-025 defines only one message for packet-mode content surveillance, that is, the Packet Envelope. The Packet Envelope message is used to convey data packets over the CDC as they are intercepted. An example of this is the short message packets sent between the handset and the Short Message Center. Optionally, J-STD-025 defines the Connection Test message, which may be used to verify the connectivity of the CDC. The Connection Test message and Packet Envelope message are supported by the intercept server 20.

Intercept Server 20

Figure 3:
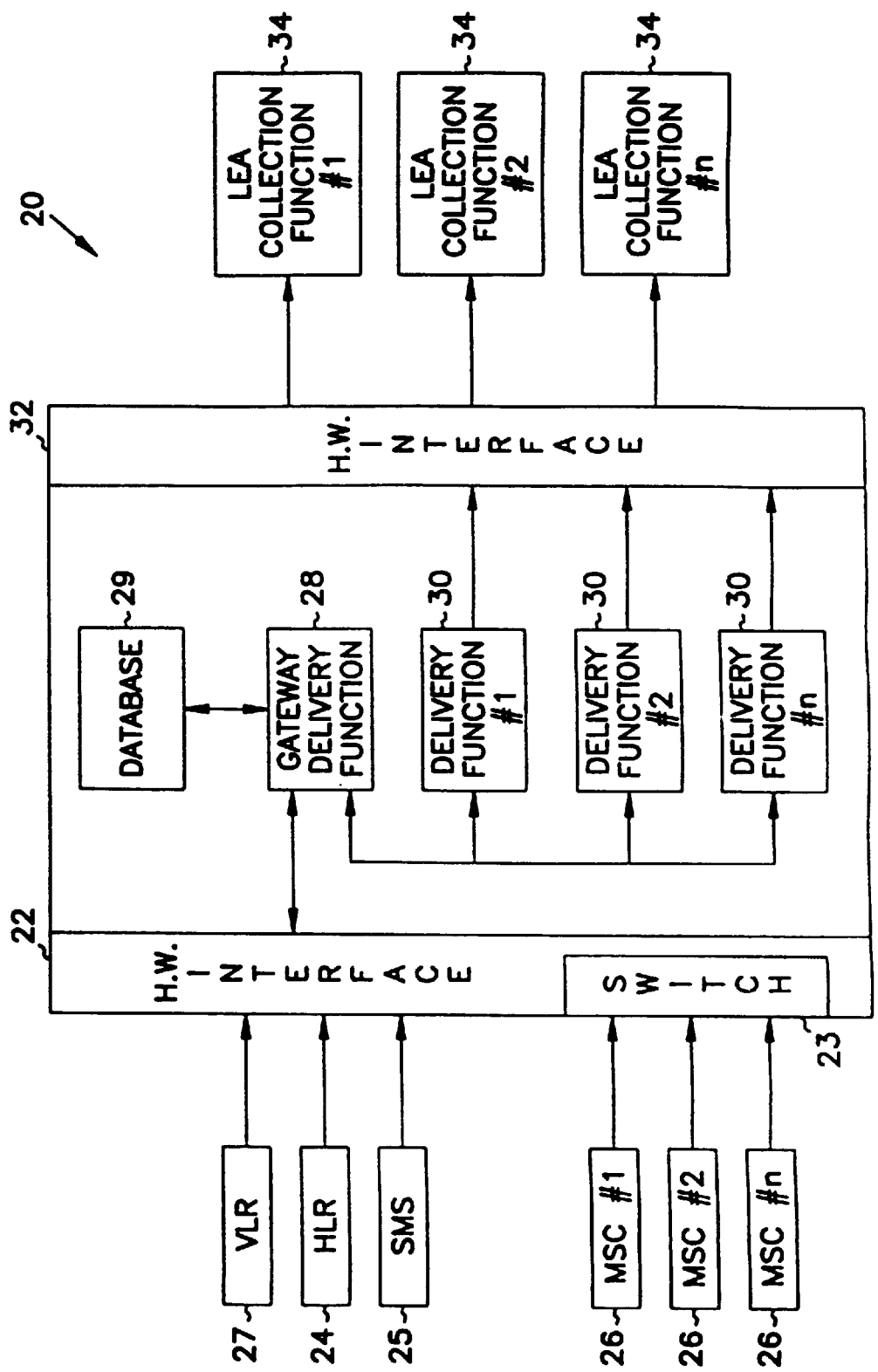
FIG. 3 illustrates a schematic functional diagram of an intercept server embodiment according to the present invention.

The intercept server 20 according to one embodiment of the invention takes the form of an off-switch platform which provides both the delivery and service provider administration functionality required by J-STD-025. Referring to FIG. 3, there is illustrated in schematic form the architecture of the intercept server 20 according to one embodiment of the invention. The intercept server 20 converts and delivers call data and content in real-time without any additional delays. Server 20 includes a first hardware interface 22 connecting the server to a home location register (HLR) 24, a visitor location register (VLR) 27, a short message server (SMS) 25, and a plurality of MSC's 26 whose wireless subscribers are served by the HLR 24, VLR 27 and the SMS 25. In some cases more than one VLR 27 may serve the MSCs 26, and furthermore the VLRs 27 may optionally be located within the MSC 26.

Server 20 includes a database 29 which retains provisioning data entered in accordance with court orders for wiretaps. Such data includes the Mobile Identification Number (MIN) of the wireless device to be monitored, the jurisdictions/locations in which such monitoring or surveillance is to take place, and the destination or destinations (LEA Collection Functions) to which intercepted information is to be sent. Database 29 contains all the details with respect to the lawful authorizations for intercept, for example the warrant id, jurisdiction area for the intercept, and duration of the intercept.

As illustrated in FIG. 4, the HLR 24 or VLR 27 provides one or more surveillance flags 1, 2 . . . n, (19) for each wireless customer/subject served by the HLR 24 or VLR 27, to control delivery of the necessary data and/or content to the intercept server 20 from the Access Functions, such as MSC 26 and SMS 25. In one example embodiment, these flags are provisioned by the Gateway Delivery Function module 28 (described below) and maintained in the HLR 24 and/or VLR 27 and/or SMS 25 and/or MSC 26 with other provisioning and customer data, indexed according to MIN 17. Individual flags 19 (or other data structures) can be provided for each surveillance parameter, such as whether to provide call content, call data, and/or messages, to the intercept server 20. When an MSC 26 or SMS 25 either sets up or otherwise processes a call or message involving a particular subscriber or MIN 17, they can either read the surveillance flag(s) 19 in an associated HLR 24 or VLR 27, or keep a local copy of all or a portion of surveillance data, and refer to it internally. VLR 27 obtains subscriber and surveillance data from a foreign HLR 24 when a roaming subscriber registers with the provider. The Gateway Delivery Function module 28 is notified of any newly registered roaming subscribers (identified by MIN numbers), and provisions any necessary surveillance data or flags in the VLR 27 and/or SMS 25, based on the wiretap orders recorded in database 29.

If an intercept is indicated for a given call or message, call associated information (from the MSC26) or message content (from the SMS 25) associated with the intercepted event is forwarded from the respective source to the Gateway Delivery Function module 28 through, for example, SS7 signaling and transport or a TCP/IP protocol over a data (e.g. Ethernet) network. In addition, in one example embodiment, MSC 26 either forwards an intercepted call to the intercept server 20, or bridges the call in the MSC 26 switch. If bridged in the MSC 26 switch, the bridge is provided to the switch 23 in interface 22 of intercept server 20. In the event the call is forwarded to the intercept server 20, it is bridged in interface 22 and looped back to the MSC 26, from where it is connected to the called party. The call content from the bridge in interface 22 is provided to switch 23, and in turn forwarded through switch 23, under control of the Gateway Delivery function module 28, to one or more Delivery Function modules 30, described below. In one example embodiment, switch 23 is capable of isolating the call content for each party to a two party call.

Gateway Delivery Function module 28 is a software object executing on the server 20. It includes a Service Provider Administration (SPA) Function which incorporates an Operations Administration and Maintenance (OAM) capability for provisioning the various entities involved in surveillance, including in particular the Access Functions and Delivery Function modules 30, as described in more detail below. As necessary, the SPA Function accepts provisioning information, such as wiretap orders, from a user, and stores it in database 29. The Gateway Delivery function module 28 uses this information or other user input to provision the HLR 24, VLR 27, SMS 25, and Delivery Function modules 30. Thus, the Gateway Delivery Function module 28 provides the service provider the ability to provision all court ordered data from a single point. The OAM provides one or more Man Machine Interfaces (MMI) for provisioning. These include the text based ITU standard MML and, optionally, a GUI interface. The OAM also provides a TCP/IP or SNMP interfaces towards the Access Functions for the provisioning of surveillance data in these entities.

As noted above, the Gateway Delivery Function module 28 receives call associated information and messages or other data from the SMS 25. The Gateway Delivery Function 28 controls and communicates with one or more Delivery Function modules 30, which take the form of a software object executing on platform 20. Each Delivery Function module 30 is dynamically instantiated and provisioned by Gateway Deliver Function module 28, in accordance with user input and/or the provisioning information maintained in database 29. Delivery function modules 30 are provisioned to forward call associated information, call content, or messages received from Gateway Delivery Function module 28 and the switch 23, to one or more LEA Collection Functions 34, through hardware interface 32.

The call content and/or data is carried to the LEA Collection Functions 34 over the Call Content Channels (CCC) or Call Data Channels (CDC), respectively, as required by J-STD-025. It is noted that CCC's or CDC's may be carried on any suitable carrier, including for example a T1 line or dedicated DS0(s) or dedicated directory numbers. According to one embodiment, the intercept server 20 provides C-tone over the dedicated CCCs towards the Collection Functions 34 when there is no intercept activity active. The C-tone is removed when the intercept activity starts and is re-established when the activity stops. This enables the Collection Functions 34 to detect when to start and stop the recording without the need of the CC Open and CC Close message. Also, Delivery Function modules 30 have the capability to store any CDC messages on a hard disk or other storage medium per Collection Function 34. This can be activated as a backup mechanism for the CDC delivery, and, if a network failure causes the CDC messages to be lost, they can be recovered from the backup storage medium. Call identifying associated information and/or messages are delivered to the LEA Collection Functions 34 over one or more CDCs using the Lawfully Authorized Electronic Surveillance Protocol (LAESP). In one example embodiment, X.25 or TCP/IP are used for the transport protocol to the LAESP.

Each Delivery Function module 30 can duplicate and deliver authorized call-identifying information and call content for an intercept subject to, in one embodiment, up to five LEA Collection Functions 34. However, distribution to fewer or greater numbers of Collection Functions 34 can be provided, and the invention is not limited to any maximum number.

As noted above, the Gateway Delivery Function module 28 ensures that the call-identifying information and call content delivered to a Collection Function 34 is authorized for a particular LEA, and provisions the Delivery Function module 30 accordingly to pass only authorized data to an authorized LEA Collection Function(s) 34. In operation, multiple CCCs can be provisioned for a particular electronic surveillance. This is necessary for intercept subjects with services supporting multiple call appearances. For example, the intercept subject can place a call which is monitored using the first available CCC. If the subject has call-forwarding-busy service, a call attempt to the subject will be forwarded to the call forwarding number which can be monitored using another CCC. Also, the Gateway Delivery Function module 28 can provision each Delivery Function module 30 to store any CDC messages, per LEA Collection Function 34. This can be activated as a backup mechanism for the CDC delivery. For example, if a network failure causes the CDC messages to be lost, they can be recovered from an intercept server 20 hard disk.

Figure 5:
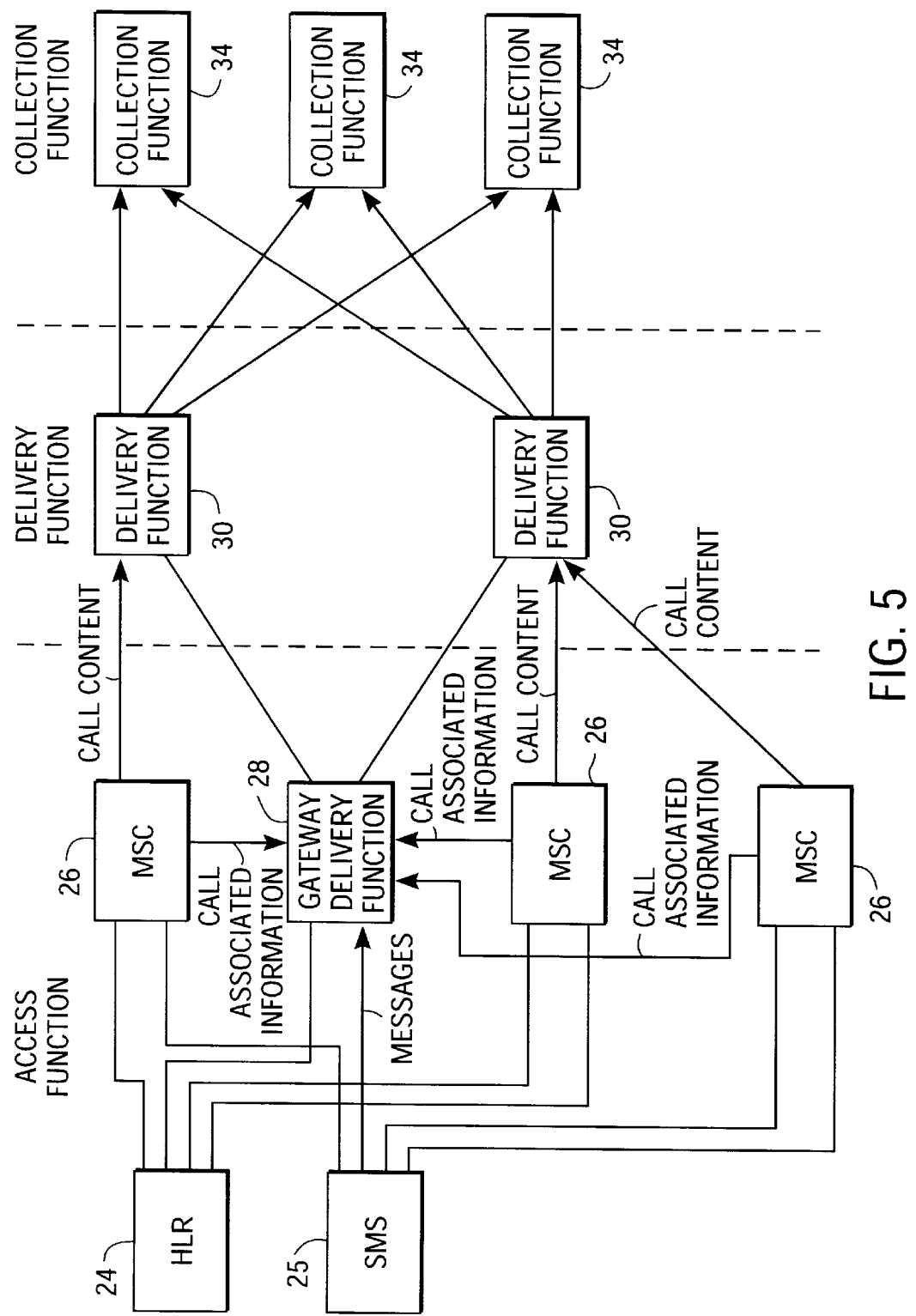
FIG. 5 illustrates a functional block diagram illustrating the distribution of functions across the access, delivery and collection functions illustrated in FIG. 2.

Referring now to FIG. 5, there is illustrated an overview of the functional relationship and operation of the server 20, organized by the Access, Delivery and Collection Functions of the model of J-STD-025 illustrated in FIG. 1. As shown in FIG. 5, the Gateway Delivery Function module 28 is separate from the Delivery Function module 30. The Access Function is performed in the TSP's equipment, by providing to the intercept server 20, in the embodiment now described, a copy of the call associated data and/or content and message traffic for a surveillance subject. A Delivery Function module 30 may receive call content from one or more MSC 26, while Gateway Delivery Function module 28 receives call associated data and/or SMS messages and/or registration messages from the MSC's 26 and/or SMS 25 and/or HLR 24, and deliver this call content and/or data and/or messages to one or more LEA Collection Functions 34. For example, more than one LEA Collection Function may be authorized to receive a copy of call data and information. Or, for another example, one LEA Collection Function 34 may be authorized to receive call data and content for all calls in any jurisdiction in the U.S., while another LEA Collection Function 34 may only be authorized to receive call data and information for calls placed within a single state. The Gateway Delivery Function module 28 thus provisions the Delivery Function modules 30 according to the custom requirements of each court ordered wire tap. The intercept server 20, through interface 32, delivers call content to the LEA Collection Functions 34 over the CCCs, and call data over CDCs, as required by STD-025. The intercept server 20 enables CCCs to be provisioned as combined or separated. In the combined delivery case, a single CCC carries both the transmit and receive paths of the channel, and in the separated delivery case, two independent CCCs are used for the transmit and receive paths.

Thus, the Gateway Delivery Function module 28 functions to synchronize the surveillance activities between the MSCs 26 and other entities that may serve more than one MSC 26, such as the HLR 24, VLR 27 and SMS 25. For example, assume for the purpose of illustration that a service provider has two MSCs 26 in a first state or jurisdiction, and two more MSCs in a neighboring state or jurisdiction, and all these MSC's 26 are served by one HLR 24 and one SMS 25. Further assume that the service provider is served by a state law enforcement agency with a court order for a subscriber, and the service provider is only required to provide the telecommunications to and from that subject in the respective state. In this case, the Gateway Delivery Function module 28 functions to provide that only the two MSCs 26 in the respective state are configured for the intercept, and report the activities of the subject only when the subject is in the respective state. When the Gateway Delivery Function module 28 receives a message from the SMS 25 about a SMS delivery to the subject, it will send that message to the correct Delivery Function module 30 to be delivered to the correct LEA with the appropriate content. The Gateway Delivery Function module 28 thus keeps track of the subject's activities and filters out an intercepted message when necessary and forwards the required messages to the correct Delivery Function module 30 to be delivered to the correct LEA Collection Function 34 with the appropriate content. The centralized entities in the network such as the HLR 24 and SMS 25 thus do not need to know the jurisdictional area where the court order is valid, they only need to know the subject is being intercepted and know the address of the Gateway Delivery Function module 28 for the purpose of routing/sending data and content associated with the activities of the subject. Thus, use of the intercept server 20 minimizes the need for configuration data within the Access Function in the TSP's equipment.

Hardware interface 22 includes an industry standard programmable switch 23, for example a model VCO/4K switch as manufactured by Summa Four. It contains T1 card(s) for voice transmission and cross connects, DSP card(s) for the conference circuits required for the intercept and DTMF reception/generation, and CPU card(s) for management of the switch. Using this switch interface, the intercept server 20 accepts call content for each intercept subject over one or more channels from the MSC's 26. Clear channel (or potentially other signaling, such as Multi Frequency (MF) or ISUP) over "nailed up" T1 lines between the MSC's switches and the switch in interface 22 is, in one possible embodiment, used for communication between the MSC switch and the intercept server 20.

The intercept server 20 is also configured, in a preferred embodiment, to protect (e.g. prevent unauthorized access, manipulation, and disclosure) intercept controls, intercepted call content and call-identifying information. For this purpose, server 20, when implemented on a UNIX platform, uses UNIX level security, or the equivalent for other platforms. The UNIX login accounts and passwords are used to provide the security to prevent unauthorized access to the Gateway Delivery Function module 30. The Service Provider Administration Function 31, through the OAM interface towards the Access Functions, can also audit the consistency of surveillance data and alerts the operator in case inconsistencies are detected.

The architecture of the intercept server 20 software is also configured for the integration of delivery from the telecommunications equipment in a multi-vendor environment towards the LEA's equipment, which in turn is also a multi-vendor environment. In this regard, each Delivery Function module 30 is preferably constructed such that its interfaces toward the MSC's 26 and the LEA Collection Functions 34 are isolated from the main Delivery Function. This enables the intercept server 20 to support multiple Access Functions and multiple Collection Functions through the interface modules (incorporated in the Delivery Function module 30) which can be added without impacting the existing functionality.

It is noted that, in an alternative embodiment, the Collection Function 34 could be configured to embody some of the function of the Delivery Function module 30, such that filtering or control of access to call content and data could be accomplished in the Collection Function 34 instead of the Delivery Function module 30. In this alternate embodiment, the Gateway Delivery Function module 28 is connected to each Collection Function 34 in addition to or instead of the Delivery Function module 30. The Delivery Function module 30 is in turn configured to pass any call content or data directly to the Collection Function 34 without applying any filters.

Platform Specifications

Preferably, the intercept server 20 is built on a high performance platform, for example a SUN workstation with a Solaris UNIX operating system (2.5.1 or 2.6). It is also desirable if the platform provides for up to 4000 port time slot interchange switch, configurable for up to 4 Access Functions, up to 64 T1 voice facilities, up to 512 simultaneous call content intercepts on a single call basis, up to 16 SS7 links; and up to 32 with Bus extender, and with optional support for X.25 and other call data intercept interfaces.

Alternate Implementations

The system as described above can be implemented in either hardware or software, and in this respect it shall be understood that the Gateway Delivery Function module 28, the Delivery Function module 30, and other Access, Delivery or Collection Functions described above in a software embodiment are implementable in combinations of hardware and software or in all hardware. Likewise, many of the functions or devices described above as implemented in hardware are equally implementable in whole or in part in software. Thus, with respect to the claims appended hereto, the term "unit" shall mean an electronic entity, which may be, for example a hardware circuit or device or software executing on a computing platform, or a combination of such.

CONCLUSION

Thus, the intercept server 20 as described above provides a system which may be used to readily adapt existing wireless communications infrastructure to comply with J-STD-025. In this regard, the intercept server 20 using Gateway Delivery Function module 28 minimizes the need for configuration data within the Access Functions such as the MSC 26, SMS 25, and HLR 24.

What is claimed is:

1. A system for intercept of wireless communications, comprising:
   a home location register (HLR) including one or more surveillance flags associated with a subscriber served by the HLR, wherein the flag(s) indicate one or more aspects of the subscriber's wireless communications are to be monitored;
   a gateway delivery function unit for provisioning the surveillance flags, and receiving call associated information for a subscriber under surveillance, wherein the gateway delivery function unit functions to synchronize surveillance activities between a number of mobile switching centers (MSCs) and the HLR, such that only a selected subset of the MSCs connected to the HLR are monitored; and a delivery function unit, provisioned by the gateway delivery function unit, receiving call associated information for intercepted call from the gateway delivery function unit, and call content from the MSC, and directing the call information and call content to a desired location such that the gateway delivery function unit provisions the delivery function unit according to the custom requirements of a court ordered wire tap.

2. A system according to claim 1 wherein the desired destination includes a law enforcement collection function.

3. A system according to claim 1 wherein the gateway delivery function unit and the delivery function comprise software objects executing on a computer.

4. A system according to claim 1 further wherein the gateway delivery function unit receives registration data or short message data for a subscriber under surveillance and forwards it to a delivery function to be delivered to a collection function.

5. A system according to claim 1 further wherein the call associated information is call origination or delivery, termination, and progress information.

6. A system according to claim 4 wherein the short message data and content are received from a short message server.

7. A system according to claim 5 further including a VLR having surveillance flags provisioned by the gateway delivery function unit.

8. A system according to claim 1 further including a database of information indicative of one or more court orders for the surveillance of a subscriber.

9. A system according to claim 8 further wherein the delivery function unit is provisioned by the gateway delivery function unit in response to data stored in the database.

10. A method for intercept of wireless communications, comprising:

call processing equipment in a mobile switching center reading one or more surveillance flags associated with a subscriber served by an HLR, wherein the flag(s) indicate one or more aspects of the subscriber's wireless communications that are to be monitored;

receiving in a gateway delivery function unit call associated information sent by the switch in response to the reading of one or more of the surveillance flags, wherein the gateway delivery function unit functions to synchronize surveillance activities between a number of mobile switching centers (MSCs) and the HLR, such that only a selected subset of the MSCs connected to the HLR are monitored; and the gateway delivery function unit provisioning a delivery function unit such that the gateway delivery function unit provisions the delivery function unit according to the custom requirements of a court ordered wire tap, wherein the delivery function unit receives the call associated information from the gateway delivery function unit, and call content from the switch and directs the call associated information call content to a desired destination.

11. A method according to claim 10 wherein the desired destination includes a law enforcement collection function.

12. A method according to claim 10 wherein the gateway delivery function unit and the delivery function unit are software programs executing on a computer.

13. A method according to claim 10 further wherein the gateway delivery function unit receives short message data for a subscriber under surveillance and forwards it to a delivery function to be delivered to a collection function.

14. A method according to claim 10 further wherein the call associated information is call origination and progress information.

15. A method according to claim 13 wherein the message data is received from a short message server.

16. A method according to claim 14 further including a VLR having surveillance flags provisioned by the gateway delivery function unit.

17. A method according to claim 10 further including a database of information indicative of one or more court orders for the surveillance of a subscriber.

18. A method according to claim 17 further wherein the delivery function unit is provisioned by the gateway delivery function unit in response to data stored in the database.

* * * * *